Dec. 23, 1958    C. J. DUBUQUE    2,865,658
ADJUSTABLE SUPPORT FOR AN IMPLEMENT
Filed July 28, 1955
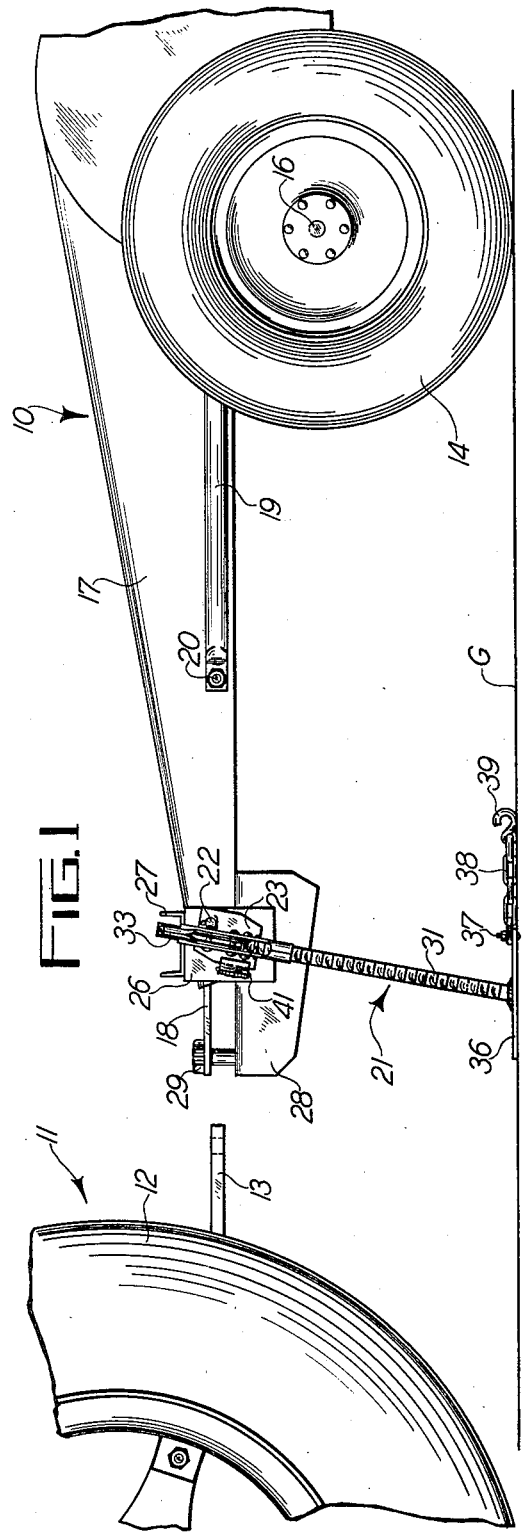
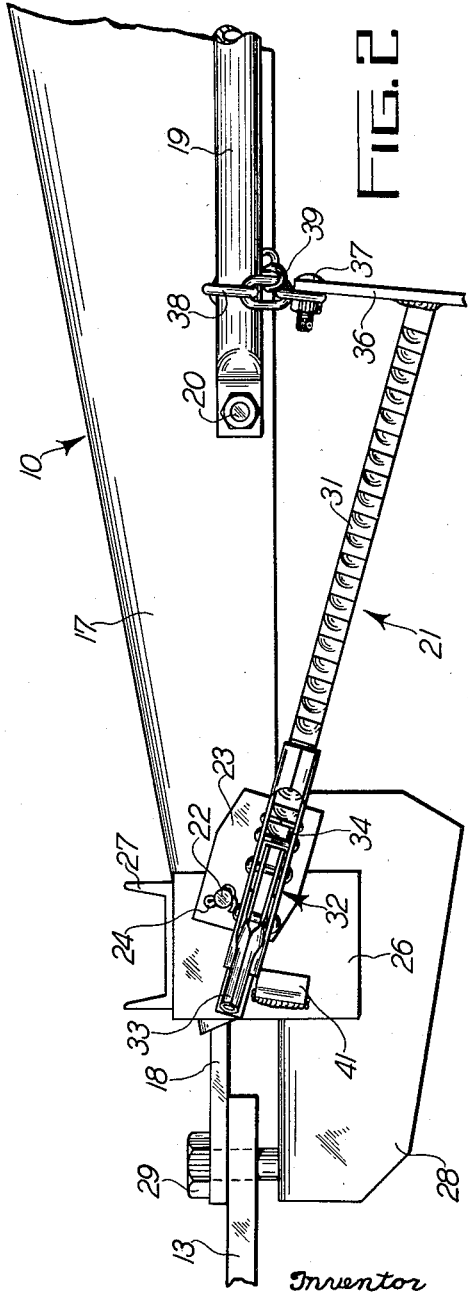
Inventor
CHARLES J. DUBUQUE
By
Emerson B. Donnell
Attorney United States Patent Office 2,865,658
Patented Dec. 23, 1958

2,865,658

ADJUSTABLE SUPPORT FOR AN IMPLEMENT

Charles J. Dubuque, Racine, Wis., assignor to J. I. Case Company, Racine, Wis., a corporation of Wisconsin Application July 28, 1955, Serial No. 524,895

3 Claims. (Cl. 280—475)

This invention relates to adjustable supports for drawbars employed between tractors and farm implements or the like.

It is an object of this invention to provide a means which will support a drawbar or towed implement off the ground at selected elevations to thereby facilitate draft attaching the drawbar or implement to a tractor or the like and to also permit said means to be readily made operative or inoperative.

Another object is to provide a means attached to the forward end of an unbalanced implement, such as a two-wheel corn stalk shredder, whereby said means supports the over-balanced side of said implement on the ground.

Other objects and advantages will become apparent upon reading the following description in conjunction with the accompanying drawings, wherein:

Fig. 1 is a side elevational view of a preferred arrangement of this invention with a fragment of an implement and a fragment of a tractor.

Fig. 2 is an enlarged fragmentary side elevational view of that shown in Fig. 1 but with parts thereof in different positions.

Similar reference numerals refer to similar parts between the two views.

Since this invention is particularly useful in conjunction with a corn stalk shredder, it is shown and described with a shredder 10 fragmentarily shown to display the forward end of the shredder. The rear end of a tractor 11 is shown with a fragment of a rear wheel 12 and a drawbar hitch 13. It should be understood that the tractor is of a conventional type and the drawbar hitch 13 is rigidly attached to the tractor to project rearwardly therefrom at a certain elevation. Of course, different styles and makes of tractors have their respective hitches at different elevations and that fact is partly the reason for this invention. As further shown, the shredder 10 is partly supported by a wheel 14 which is one of a pair of wheels mounted on a straight axle 16 with the latter, of course, disposed transverse to the longitudinal direction of movement of the shredder 10 and the tractor 11. The ground supporting the tractor and the shredder wheels is indicated by the line "G." A shield 17 is attached as a part of the shredder 10 and it extends along the center line of the shredder drawbar 18. Also, a brace 19 is attached to the shield 17 by a bolt 20 to diagonal rearwardly therefrom to attach to another, but not shown, part of the shredder 10.

Since the shredder 10 is of a well-known construction, no further description thereof is deemed to be necessary and it should be understood that the shredder is over-balanced at its forward end which, therefore, tends to fall to the ground. To support the forward end of the unbalanced implement, such as the corn stalk shredder shown, a jack 21 is pivotally attached to the forward end of the shredder by a rod 22 engaged with a plate 23 attached to the jack and a pin 24 secures the jack on the rod 22. Thus, the plate 23 is suitably connected to the drawbar 18 so that the two are attached through the rod 22. The shredder forward end, at the point of the jack attachment, includes a vertical plate 26 which supports the rod 22 and a channel 27 strengthens the structure across the front end. Also, a second shield 28 is attached to the forward end to be spaced below the drawbar 18 to permit the tractor hitch 13 to be received as shown in Fig. 2. Of course, the usual hitch pin 29 and the aligned hitch holes are provided to draft connect the tractor and the implement.

The jack 21 includes a conventional standard 31, with its usual indentations, and the conventional operating mechanism at 32 with the usual operating lever stub 33 attached to the mechanism 32. Attachment of the jack to the implement 10 is through the operating mechanism housing which is attached by welding or the like to the plate 23. Also, the usual jack latch 34 is operatively connected to the mechanism 32 for controlling upward and downward movement of the jack mechanism on the standard 31. The standard 31 is slightly oblique with respect to the jack base plate 36 and the two pieces are shown welded together at the oblique angle. A bolt 37 is attached to the plate 36 to secure a chain 38 having a hook 39 at one end of the chain.

Fig. 1 shows the jack 21 supporting the front end of the implement 10 with an abutment plate 41 welded to the plate 26 to engage the plate 23 in a manner which will position the standard at the oblique angle with respect to the ground. It will also be noted that the abutment 41 is spaced from the plate 26 since the front edge of the plate 23 is beyond the edge of the abutment 41 in Fig. 1. This arrangement makes the jack laterally stable on the drawbar as well as longitudinally stable when the abutting contact is made as in Fig. 1. The oblique angle, of course, provides for a stable support of the implement since the latter cannot fall at the forward end nor can it roll either forward or backward, in addition to the lateral stability, and the angle can be termed a reclining angle with respect to the implement. The front end of the implement can then be raised or lowered to align with the tractor hitch as the tractor is backed to hitch with the implement. Upon completing the hitch connection, the jack standard and base can be raised off the ground after the latch 34 is released and the jack can then be swung about the rod 22 to the Fig. 2 position. The base 36 is then substantially directly behind the plate 23 and it is attached to the brace 19 through the chain 38 secured by the hook 39.

Thus, the jack 21 remains on the implement to adjust the elevation of the front end of it for alignment with a tractor hitch and to support the front end when the implement is not in use.

While a specific embodiment of this invention has been shown and described, it should be obvious that certain changes could be made in the embodiment and the invention should, therefore, be limited only by the scope of the appended claims.

I claim:

1. In a stalk shredder having a body portion the combination of a front structure including a shield portion extending forwardly along the center line of the shredder, a drawbar portion extending forwardly of and attached to said shield portion, said shredder being so balanced as to impose a portion of its weight on said front structure, an upwardly directed substantially vertically disposed stabilizing plate on said front structure, a second plate juxtaposed to the first plate in face to face relation, a pivot member connecting said plates for swinging said second plate in a plane substantially parallel to said first plate, a jack element fixed on the second plate forwardly of said pivot, stop means on said first plate, said second plate and said jack being swingable downwardly from an upper inoperative position through a vertical position to a downwardly inclined position resting against said stop means whereby the weight imposed on said front structure tends to further swing said jack, said stop portion being positioned on the opposite side of said jack element from said pivot to be engaged by said second plate to prevent further swinging of said plate and jack.

2. In a vertical support for an over-balanced front end of an implement to be towed by a tractor having a hitch at a certain fixed elevation, the combination of a drawbar affixed to said implement to extend forwardly thereof, a first plate attached to said implement adjacent the front end of said drawbar and disposed in an upright plane, a second plate pivotally connected to one side of said first plate for pivotal movement in a plane parallel thereto, a jack attached to said second plate forwardly of said pivot and pivotal therewith for vertically adjustably supporting the front end of said implement, an abutment on said one side of said first plate forward of said second plate on the opposite side of said jack from said pivot and spaced from said first plate at the rear of said abutment for receiving the front edge of said second plate when the latter is pivoted forwardly for both limiting the pivotal movement of said second plate to position said jack at a reclining angle with respect to the forward motion of said implement when supporting the latter on the ground and for limiting movement of said second plate and said jack transverse to the plane of pivot, and means on said implement for maintaining said jack pivoted off the ground when said implement is engaged with said tractor.

3. In a vertical support for an over-balanced forward end of an implement, the combination of a drawbar attached to said implement and extending forwardly thereof, a plate pivotally connected to one side of the forward end of said drawbar and disposed in an upright plane, a jack attached to said plate for pivotal movement therewith in said upright plane for supporting said implement in its over-balanced position and for adjustably elevating said drawbar, an abutment on said drawbar disposed forward of and below the pivot of said plate for limiting forward pivotal movement thereof, said abutment including a rear end spaced from said drawbar for snugly receiving a front edge of said plate upon forward pivot of said plate for restricting transverse movement of said plate with said jack, and said plate providing an edge portion downwardly spaced relatively to said pivot for engagement with said abutment.

References Cited in the file of this patent
UNITED STATES PATENTS

| | | |
|---|---|---|
| 1,183,880 | Johnston | May 23, 1916 |
| 2,090,776 | Arndt | Aug. 24, 1937 |
| 2,153,722 | Loughmiller | Apr. 11, 1939 |
| 2,225,157 | Court | Dec. 17, 1940 |
| 2,455,195 | Russell | Nov. 30, 1948 |
| 2,474,483 | Luttrell | June 28, 1949 |
| 2,519,364 | Fredholm | Aug. 22, 1950 |
| 2,634,941 | Eckert | Apr. 14, 1953 |
| 2,727,751 | Souris | Dec. 20, 1955 |
| 2,794,688 | Scott | June 4, 1957 |